(12) United States Patent
Waltzer et al.

(10) Patent No.: US 12,555,481 B2
(45) Date of Patent: Feb. 17, 2026

(54) WRONG WAY DRIVING MONITORING BASED ON OBJECT DETECTION

(71) Applicant: GovComm LLC, Wilmington, DE (US)

(72) Inventors: Craig A. Waltzer, Ft. Lauderdale, FL (US); Svetoslav Veltchev, Ft. Lauderdale, FL (US); Guy Rabbat, Half Moon Bay, CA (US)

(73) Assignee: GovComm LLC, Wilmington, DE (US)

( * ) Notice: Subject to any disclaimer, the term of this patent is extended or adjusted under 35 U.S.C. 154(b) by 321 days.

(21) Appl. No.: 18/326,941

(22) Filed: May 31, 2023

(65) Prior Publication Data

US 2024/0185720 A1 Jun. 6, 2024

Related U.S. Application Data

(60) Provisional application No. 63/392,194, filed on Jul. 26, 2022.

(51) Int. Cl.
| | |
|---|---|
| *G08G 1/16* | (2006.01) |
| *G06T 7/246* | (2017.01) |
| *G06V 20/54* | (2022.01) |
| *G08G 1/01* | (2006.01) |
| *G08G 1/056* | (2006.01) |

(52) U.S. Cl.
CPC ............ *G08G 1/166* (2013.01); *G06T 7/246* (2017.01); *G06V 20/54* (2022.01); *G08G 1/0133* (2013.01); *G08G 1/056* (2013.01); *G08G 1/164* (2013.01); *G06T 2207/10016* (2013.01); *G06T 2207/20081* (2013.01); *G06T 2207/30236* (2013.01); *G06V 2201/08* (2022.01)

(58) Field of Classification Search
CPC ...... G08G 1/166; G08G 1/0133; G08G 1/056; G08G 1/164; G08G 1/04; G06T 7/246; G06T 2207/10016; G06T 2207/20081; G06T 2207/30236; G06V 20/54; G06V 2201/08

See application file for complete search history.

(56) References Cited

U.S. PATENT DOCUMENTS

| | | | | |
|---|---|---|---|---|
| 8,957,788 | B2 * | 2/2015 | Loce | G06T 7/246 |
| | | | | 382/104 |
| 9,847,022 | B2 * | 12/2017 | Arpin | G06V 20/54 |
| 10,407,853 | B1 * | 9/2019 | Dunn | E01F 13/105 |
| 12,103,523 | B2 * | 10/2024 | Nayak | B60W 30/09 |
| 12,146,961 | B2 * | 11/2024 | Hamaguchi | G01S 17/42 |

(Continued)

*Primary Examiner* — Kenny Nguyen

(57) ABSTRACT

Disclosed herein are system, method, and computer program product embodiments for monitoring a detection zone of a road to detect a vehicle moving in a wrong direction. A method can comprise identifying a first object in a first image; identifying a second object in a second image; and determining if the first object and the second object is a same vehicle. The method can further include determining a movement direction of the vehicle and a moving distance that the vehicle has traveled in the movement direction, and determining if the movement direction of the vehicle is the same as the monitored direction. In response to a determination that the movement direction is the same direction as the monitored direction and the moving distance of the vehicle is larger than a predetermined monitoring distance, the method can generate a warning signal to indicate that the vehicle is traveling in a wrong-way.

20 Claims, 10 Drawing Sheets

(56) References Cited

U.S. PATENT DOCUMENTS

| | | | |
|---|---|---|---|
| 2016/0210855 A1* | 7/2016 | Jeschke | G08G 1/056 |
| 2018/0348064 A1* | 12/2018 | Irie | G01M 99/002 |
| 2019/0031207 A1* | 1/2019 | Nakamura | G06F 16/9537 |
| 2019/0272687 A1* | 9/2019 | Dudar | F01P 5/043 |
| 2019/0378407 A1* | 12/2019 | Correia | G08G 1/09675 |
| 2020/0327350 A1* | 10/2020 | Anand | G06V 20/56 |
| 2021/0199804 A1* | 7/2021 | Hamaguchi | G08G 1/0175 |
| 2021/0208282 A1* | 7/2021 | Hamaguchi | G01S 17/42 |
| 2022/0172611 A1* | 6/2022 | Turato | H04B 10/073 |
| 2022/0337810 A1* | 10/2022 | Tauber | G01J 5/80 |
| 2022/0413494 A1* | 12/2022 | Kim | G05D 1/0038 |
| 2023/0111391 A1* | 4/2023 | Nayak | B60Q 1/525 |
| | | | 701/301 |
| 2023/0334120 A1* | 10/2023 | Clifford | G08G 1/0141 |
| 2023/0360533 A1* | 11/2023 | Kashihara | G08G 1/09 |
| 2024/0249615 A1* | 7/2024 | Yoshinaka | G08G 1/056 |
| 2024/0369694 A1* | 11/2024 | Koiji | G01S 15/42 |

\* cited by examiner

Image at time t

Image at time t+1

Image at time t+2

Detection zone
420

Image at time t+3

Detection zone
420

WRONG WAY DRIVING MONITORING BASED ON OBJECT DETECTION

REFERENCE TO RELATED APPLICATION

This application claims priority to U.S. Provisional Patent Application No. 63/392,194, filed Jul. 26, 2022, the entirety of which is hereby incorporated by reference.

BACKGROUND

Wrong-way driving involves a vehicle traveling in the opposite direction of traffic flow which can be caused by an impaired, elderly or confused driver entering a highway exit ramp or turning onto a one-way street in the wrong direction. Wrong-way driving is a dangerous behavior that can lead to fatal accidents. Although wrong-way driving incidents make up a small portion of all road accident statistics, they have one of the deadliest fatality rates among all possible causes. The National Highway Traffic Safety Administration (NHTSA) states wrong-way collisions are more likely to result in severe injuries and fatalities than other types of accidents. Even further, in recent years, the number of wrong-way accidents have increased, and this trend has prompted transportation authorities to seek solutions to prevent wrong-way driving.

BRIEF SUMMARY

Disclosed herein are system, apparatus, device, method and/or computer program product embodiments, and/or combinations and sub-combinations thereof for monitoring, detecting, alerting drivers and notifying authorities when a vehicle is traveling counter to traffic flow. A virtual detection zone is established by a computer system to detect vehicles traveling in the wrong direction within a detection zone on the road. When a wrong-way driving incident is confirmed by the system, a warning such as flashing red lights on a highlighted wrong-way sign are immediately activated as an alert to provide the driver with an opportunity to take corrective action before entering the highway or arterial road in the wrong direction and a possible head-on collision. In real-time, the wrong-way incident is also reported to a traffic management center and law enforcement. The detection of a vehicle traveling counter to expected traffic flow in a traffic scene is accomplished by identifying objects as vehicles, then monitoring vehicle movements within a defined virtual detection zone. Consecutive still frames are extracted from an imaging device, then analyzed by an imaging device controller, or simply referred to as a controller. The controller analyzes consecutive still frames from the imaging device and determines whether a vehicle is moving in the wrong direction, where a still frame may be simply referred to as an image.

In some embodiments, a wrong-way vehicle detection device can include a video camera with optical, thermal and/or other sensor technologies installed and coupled locally with a controller. The controller monitors the video in a virtual detection zone by examining vehicle movement within a sequence of still images. The video camera is installed on a highway exit ramp or other one-way street, and the controller is either local or remote.

In some embodiments, the controller can identify a first object in the first image generated at a first time instance, identify a second object in the second image generated at a second time instance after the first time instance, and determine if the first object is a vehicle, and if the second object is the same vehicle. In addition, the controller can determine movement direction of the vehicle in the second image and a moving distance that the vehicle has travelled in the movement direction in the second image, based on a first position of the first object in the first image and a second position of the second object in the second image. In some embodiments, the first object and the second object are identified based on an object library provided using machine learning. In some embodiments, the controller can determine a two-dimensional coordinate of the first object in the first image, and a second two dimensional coordinate of the second object in the second image, and determine the movement direction of the vehicle in the second image and the moving distance of the vehicle based on the two dimensional coordinates of the first object and the second object.

The controller can determine if the movement direction of the vehicle is the same as the monitored direction. In response to a determination that the movement direction of the vehicle is the same direction as the monitored direction and the moving distance of the vehicle is larger than a predetermined monitoring distance, the controller can output a warning signal that the vehicle is traveling the wrong-way. In some embodiments, the warning signal can activate a highlighted flashing sign and/or a sound to alert a driver of the vehicle. In addition, the controller can provide a written or image notification to a server in a local traffic management center or law enforcement center.

In some embodiments, the sequence of images can further include a number of images that are more than two images such as the first image and the second image. The first image and the second image can form two consecutive images, and the moving distance is a first moving distance between the two consecutive images. Similarly, the predetermined monitoring distance is a first predetermined monitoring distance. In response to a determination that the first moving distance is smaller than the first predetermined monitoring distance but larger than a second predetermined monitoring distance between the two consecutive images, the controller can identify a third object in a third image generated at a third time instance after the second time instance, where the third object is the same vehicle as the first object and the second object. Afterwards, the controller can determine a movement direction of the vehicle in the third image and a second moving distance that the vehicle has traveled in the movement direction in the third image based on the second position of the second object in the second image and a third position of the third object in the third image. In response to a determination that the movement direction of the vehicle in the third image is same as the monitored direction and a sum of the first moving distance and the second moving distance is larger than the first predetermined monitoring distance, the controller can output the warning signal.

In some embodiments, the vehicle wrong-way driving detection device can further include a counter to count up to a predetermined number of images of the sequence of images including the first image, the second image adjacent to the first image, and the third image adjacent to the second image. In response to a determination that the sum of the first moving distance and the second moving distance is less than the first predetermined monitoring distance, the controller can determine a total moving distance traveled by the vehicle based on the count of the predetermined number of images where the vehicle is identified. The total moving distance includes a sum of the first moving distance, the second moving distance, and one or more additional moving distance determined for two consecutive images. In response to a determination that the total moving distance travelled by the vehicle is larger than the first predetermined monitoring distance, the controller can output the warning signal. In some embodiments, the controller can further receive a user input to adjust the predetermined number of images in the sequence of images of the detection zone, the first predetermined monitoring distance, and/or the second predetermined monitoring distance between two consecutive images.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
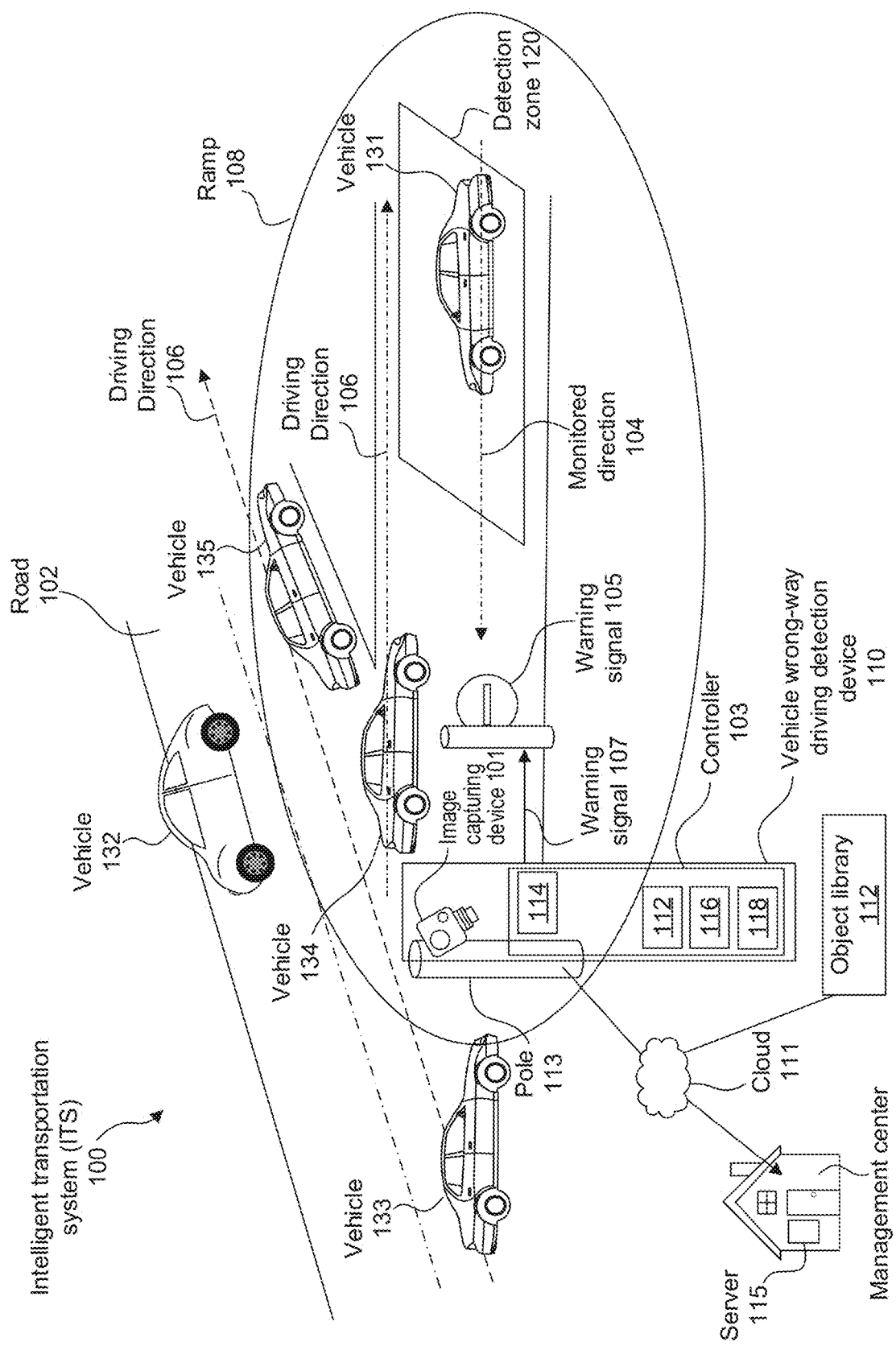
FIG. 1 is a block diagram illustrating a vehicle wrong-way driving detection device monitoring a detection zone for traffic in an intelligent transportation system (ITS), according to some embodiments.

Wrong-way driving is a serious issue that causes fatalities and accidents on highways or other locations. The personal and financial impacts of individuals involved in crashes caused by wrong-way driving vehicles are significant. The National Transportation Safety Board (NTSB) estimates that the cost of wrong-way crashes on divided highways and freeways can be around billions of dollars annually, considering factors such as medical costs, property damage, lost productivity, and legal fees. Furthermore, these fatal accidents can take many people's lives. Creating a safe roadway for individuals by removing or reducing wrong-way driving incidents will save lives, money and property. As the US Department of Transportation proceeds to chart the path towards its 'Vision Zero' goal of zero traffic fatalities using its Safe System approach, wrong-way driving accidents are in the crosshairs of transportation agencies as a significant obstacle.

Wrong-way detection systems (WWDS) play an important role in preventing wrong-way driving incidents in an intelligent transportation system (ITS). The quality of the vehicle wrong-way driving detection device used in WWDS is important. Traditional vehicle wrong-way driving detection devices or WWDS rely on microwave sensors and cameras to detect wrong-way driving. However, a simple WWDS having microwave sensors and cameras may not be enough, and they often generate false alarms. A false alarm happens when the WWDS determines there is a wrong-way vehicle and generates a warning or alarm, while in reality there is no vehicle driving in a wrong way. False alarms can be triggered by various motorist factors or non-motorist factor, such as weather or pedestrians triggering the WWDS. Frequent false alarms can reduce traffic management center and law enforcement confidence in the WWDS, leading to less effective WWDS response. Accurate detection of wrong-way driving requires a system that can distinguish between legitimate wrong-way driving and other situations that trigger false alarms.

Embodiments herein present techniques improving detection accuracy for wrong-way driving detection. A controller of a vehicle wrong-way driving detection device, or simply a controller of a detection device, can be configured to monitor a detection zone, and a monitored direction by examining live vehicle direction and velocity. Embodiments herein can determine a wrong-way driving event based on a sequence of images of the detection zone streamed by an imaging device installed in a high incident location (such as a highway exit ramp) to provide a view of a virtual detection zone then streamed to a controller. The controller can define a detection zone, capture, generate, monitor, and tracking a series of still images within the detection zone. A controller monitors extracted still images of vehicles within the detection zone and based on object detection techniques, determines direction of the vehicle and a moving distance that the vehicle has traveled in the movement direction. In response to a determination that the movement direction of the vehicle is the same direction as the monitored direction and the moving distance of the vehicle is larger than a predetermined monitoring distance, the controller can output a warning signal that the vehicle is traveling in the wrong-way. Accordingly, by using both the monitored direction and the moving distance of the vehicle being larger than a predetermined monitoring distance, the chance of a false alarm of wrong-way vehicle determination can be reduced. In addition, the object detection techniques used to determine the vehicle, and its movement direction and distance are based on a real-time object detecting machine learning platform that identifies, classifies, and analyzes the presence and behavior of vehicles, persons, and other objects. Such a machine learning platform can improve the accuracy of the vehicle wrong-way driving detection device, reducing false alarms and improving the functionalities of the vehicle wrong-way driving detection device.

In some embodiments, the vehicle wrong-way driving detection device can be installed on a highway exit ramp for the purpose of warning drivers traveling in a direction counter to one-way traffic flow by activating highlighted flashing wrong-way warning signs so that the driver can take corrective action. The system can also provide time-sensitive written and image notifications to the local traffic management center and law enforcement.

FIG. 1 is a block diagram illustrating a vehicle wrong-way driving detection device 110 monitoring a detection zone 120 for traffic in an ITS 100, according to some embodiments. ITS 100 include a road 102 having a ramp 108 that includes the detection zone 120, where the detection zone 120 can be a part of the ramp 108, the complete ramp 108, or the complete ramp 108 in addition to some surrounding area.

In some embodiments, the vehicle wrong-way driving detection device 110 can include an imaging device 101 and a controller 103 coupled to imaging device 101. Imaging device 101 can be installed in a location to monitor detection zone 120 for traffic in a monitored direction 104 and configured to generate a sequence of images of the detection zone 120. Controller 103 can be installed within a proximity of the location where the imaging device 101 is installed. In some embodiments, the imaging device 101 can be installed in a location near a highway exit. For example, the imaging device 101 and the controller 103 can be both installed on a pole 113 near an exit of road 102. Vehicle wrong-way driving detection device 110 can be coupled to a warning sign 105, and to a server 115 in a local traffic management center or law enforcement center 109. In some embodiments, the vehicle wrong-way driving detection device 110 can be coupled to the server 115 by a cloud computing environment 111. Road 102 can be a highway, or any other road with an exit or entrance including the detection zone 120.

In some embodiments, there can be various vehicles travelling on road 102. For example, a vehicle 132 travels in one direction, and another vehicle 133, vehicle 134, and vehicle 135 travel in another direction, e.g., driving direction 106, of road 102. Vehicle 134 may take driving direction 106 to exit road 102. Detection zone 120 can be located near the exit of road 102. In addition, a vehicle 131 enters detection zone 120 in monitored direction 104, which is an opposite direction of driving direction 106. Accordingly, vehicle 131 drives in a wrong way, and the monitored direction 104 is the wrong-way direction to be monitored by the vehicle wrong-way driving detection device 110.

In some embodiments, a vehicle, such as vehicle 131, vehicle 132, vehicle 133, vehicle 134, and/or vehicle 135, may be a selected one of a commercial truck, a light duty car, a sport utility vehicle (SUV), a light vehicle, a heavy duty vehicle, a pickup truck, a van, a car, a motorcycle, or any other vehicle. In some embodiments, a vehicle, such as vehicle 131, vehicle 132, vehicle 133, vehicle 134, and/or vehicle 135, can be a computer assisted or autonomous driving (CA/AD) vehicle. In some embodiments, a vehicle, such as vehicle 131, vehicle 132, vehicle 133, vehicle 134, and/or vehicle 135, may include an in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), electronic/engine control modules (ECMs), embedded systems, microcontrollers, control modules, or engine management systems (EMS). Other such vehicles are contemplated as being within the scope of the present disclosure, as would become apparent to persons skilled in the art.

In some embodiments, imaging device 101, controller 103, server 115, cloud 111, and warning sign 105 can include various communication capability, such as wired communication or wireless communication. In some embodiments, imaging device 101, controller 103, server 115, and warning sign 105 can be configured to operate based on a wide variety of wireless communication techniques and network. In some embodiments, network coupling imaging device 101, controller 103, server 115, cloud 111, and warning sign 105 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a WiFi network, a WiMax network, a network based on 3rd Generation Partnership Project (3GPP) standards, or other wireless network. In addition, imaging device 101, controller 103, server 115, cloud 111, and warning sign 105 can communicate with a vehicle, such as vehicle 131, vehicle 132, vehicle 133, vehicle 134, vehicle 135, using a vehicle-to-vehicle (V2V) network, a vehicle-to-infrastructure (V2I) communication network, a vehicle-to-network (V2N) communication network, a vehicle-to-pedestrian (V2P) communication network, a V2X communication network, any other type of network, or a combination of two or more such networks.

In some embodiments, the cloud 111 can include a cloud computing system that delivers computing as a service or shared resources. Cloud computing system can provide computation, software, data access, storage, and/or other services that do not require end-user knowledge of a physical location and configuration of a system and/or a device that delivers the services. In some examples, cloud computing system can include Amazon® Web Services (AWS), Microsoft® Azure, Google® Cloud, IBM® Cloud, Oracle® Cloud Infrastructure, or any other cloud computing system.

In some embodiments, ITS 100 can further include various base stations, such as a node B, an enhanced or evolved node B (eNB), a next generation nodeB (gNB), a base transceiver station (BTS), an access point (AP), a roadside unit (RSU), or other communication components, which are not shown.

In some embodiments, imaging device 101 can include at least one of an optical device, a camera, a video camera, a digital camera, a camcorder, a digital single lens reflex (DSLR) camera, a 360-degree camera, a thermal device, an infrared device, and a bi-spectrum device including at least one optical sensor configured to generate the sequence of images, and a thermal sensor configured to generate a heat level of the vehicle. In some embodiments, imaging device 101 can assign a temperature to a pixel color for an image generated based on the heat level generated by the thermal sensor of the bi-spectrum device.

In some embodiments, controller 103 or server 115 can be a desktop workstation, a server, a host server, a web server, an application server, a data center device, and/or embedded system, a computing device communicatively coupled together and to other devices such as imaging device 101. In some embodiments, controller 103 or server 115 can each include an operating system operated on a hardware platform, where the hardware platform may include one or more processor, controller, digital signal processor, network processor, security processor, an application specific integrated circuit (ASIC), or any other hardware components used in the industry.

In some embodiments, controller 103 can include a storage 114, a processor 116, and an object detection system 118 operated by processor 116. In embodiments, processor 116 can include one or more central processing unit (CPUs). In some embodiments, processor 116 can include a programmable device (such as a hardware accelerator or a FPGA). In embodiments, processor 116 can be a microcontroller, a 16-bit processor, a 32-bit processor, a 64-bit processor, a single core processor, a multi-core processor, a digital signal processor, an embedded processor, or any other processor. In some embodiments, object detection system 118 can use an object library 112 that can be coupled to controller 103 through cloud 111 to perform objection detections. In some other embodiments, object library 112 can be stored in storage 114 of controller 103.

Figure 2:
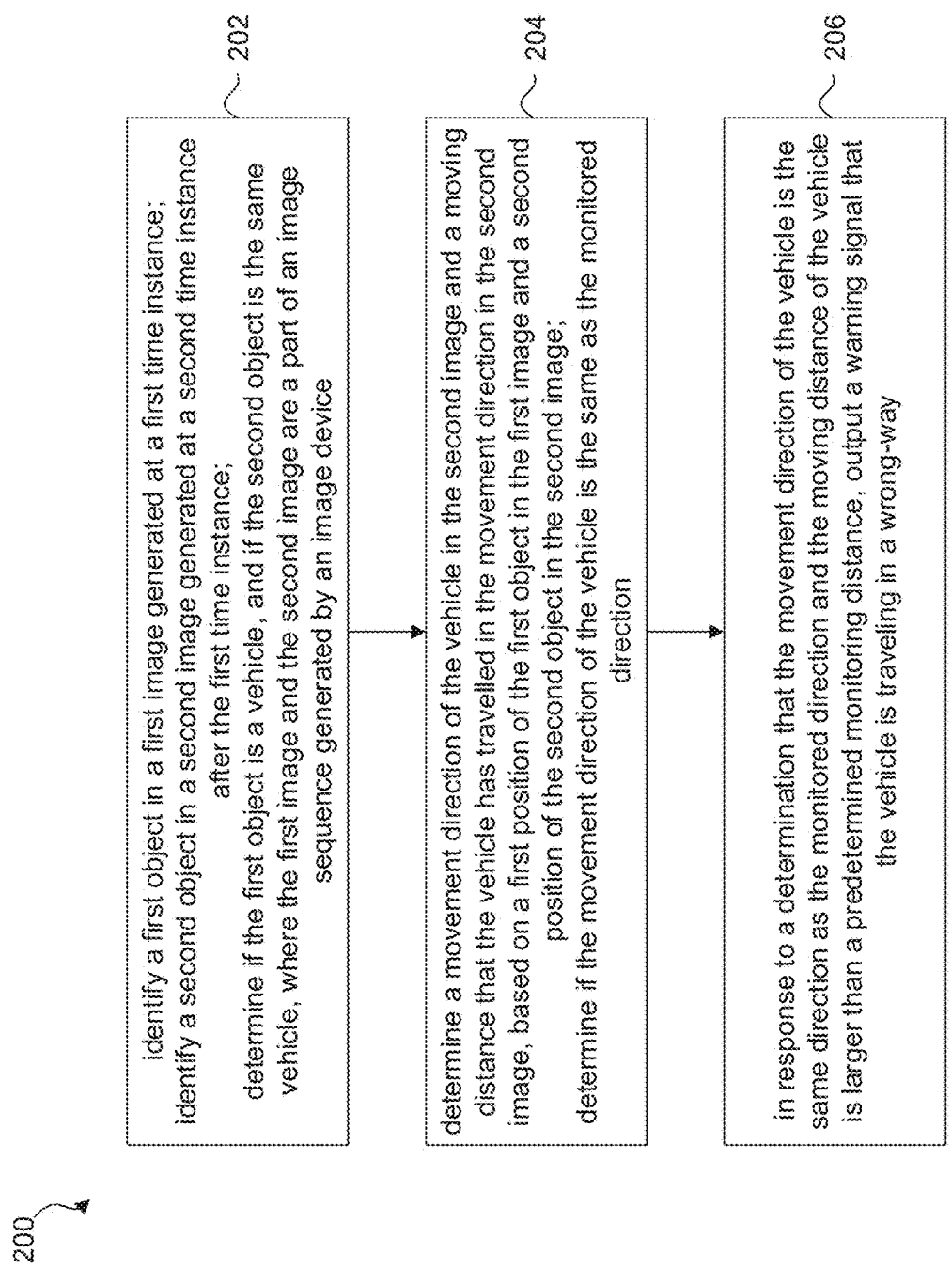
FIG. 2 illustrates an exemplary process for determining that a vehicle travels in a wrong-way based on detection of objects in a sequence of images of the detection zone, according to some embodiments.

In some embodiments, imaging device 101 can be installed in a location, such as pole 113, to monitor detection zone 120 for traffic in monitored direction 104. Imaging device 101 can generate a sequence of images of detection zone 120. In addition, controller 103 can be coupled to imaging device 101 and installed within a proximity of the location for imaging device 101. By placing imaging device 101 and controller 103 in close proximity of each other, controller 103 can perform operations, such as object detection by object detection system 118, or perform operations of process 200 as shown in FIG. 2, without the delay of transmitting the sequence of images of detection zone 120 to a faraway location. In other current ITS systems, the sequence of images of detection zone 120 can be transmitted to another system not close to imaging device 101, which may cost addition time, such as 1 second. For example, some other vehicle wrong-way driving detection device 110 can rely on an Internet Protocol (IP) camera analytics, which transmits an image generated by a camera to a remote location for analytics. Such IP camera based analytics may have limited control of their logic and do not have the resources to perform high speed analytics as performed by controller 103. In ITS 100 where a vehicle wrong-way driving is being detected, saving 1 second time in image transmission may lead to the difference of life or death. Therefore, placing imaging device 101 and controller 103 in close proximity of each other can improve the functionality of ITS 100.

In some embodiments, imaging device 101 can monitor detection zone 120 for traffic in monitored direction 104 and generate a sequence of images of detection zone 120 including a first image and a second image. In addition, controller 103 can receive the sequence of images from imaging device 101 and further perform operations of process 200 as shown in FIG. 2. In some embodiments, imaging device 101 can be a video camera generating a video stream of the detection zone 120 and send the video stream to controller 103, and controller 103 can extract still images from the video streams generated by the video camera to become the sequence of images of detection zone 120. When it is determined that vehicle 131 is moving in the same direction as monitored direction 104 and the moving distance of vehicle 131 is larger than a predetermined monitoring distance, controller 103 can output a warning signal 107 to indicate that the vehicle is traveling in a wrong-way, which can be transmitted to warning sign 105. Warning signal 107 can activate a highlighted flashing sign and/or a sound, which can be a function of warning sign 105, to alert a driver of vehicle 131.

FIG. 2 illustrates process 200 for determining that vehicle 131 travels in a wrong-way based on detection of objects in a sequence of images of detection zone 120, according to some embodiments. Process 200 can be performed by controller 103. Before process 200 starts, a sequence of images of detection zone 120 have been streamed by imaging device 101 and transmitted to controller 103 to be saved into storage 114. Processor 116 and object detection system 118 can perform process 200. In addition, FIGS. 3A-3C illustrate the operations of process 200 in more details.

At 202, controller 103 can identify a first object in a first image generated at a first time instance, identify a second object in the second image generated at a second time instance after the first time instance, and determine if the first object is a vehicle, and if the second object is the same vehicle, where the first image and the second image are a part of an image sequence streamed by an imaging device. In some embodiments, the first object and the second object are identified based on an object library provided using machine learning.

Figure 3A:
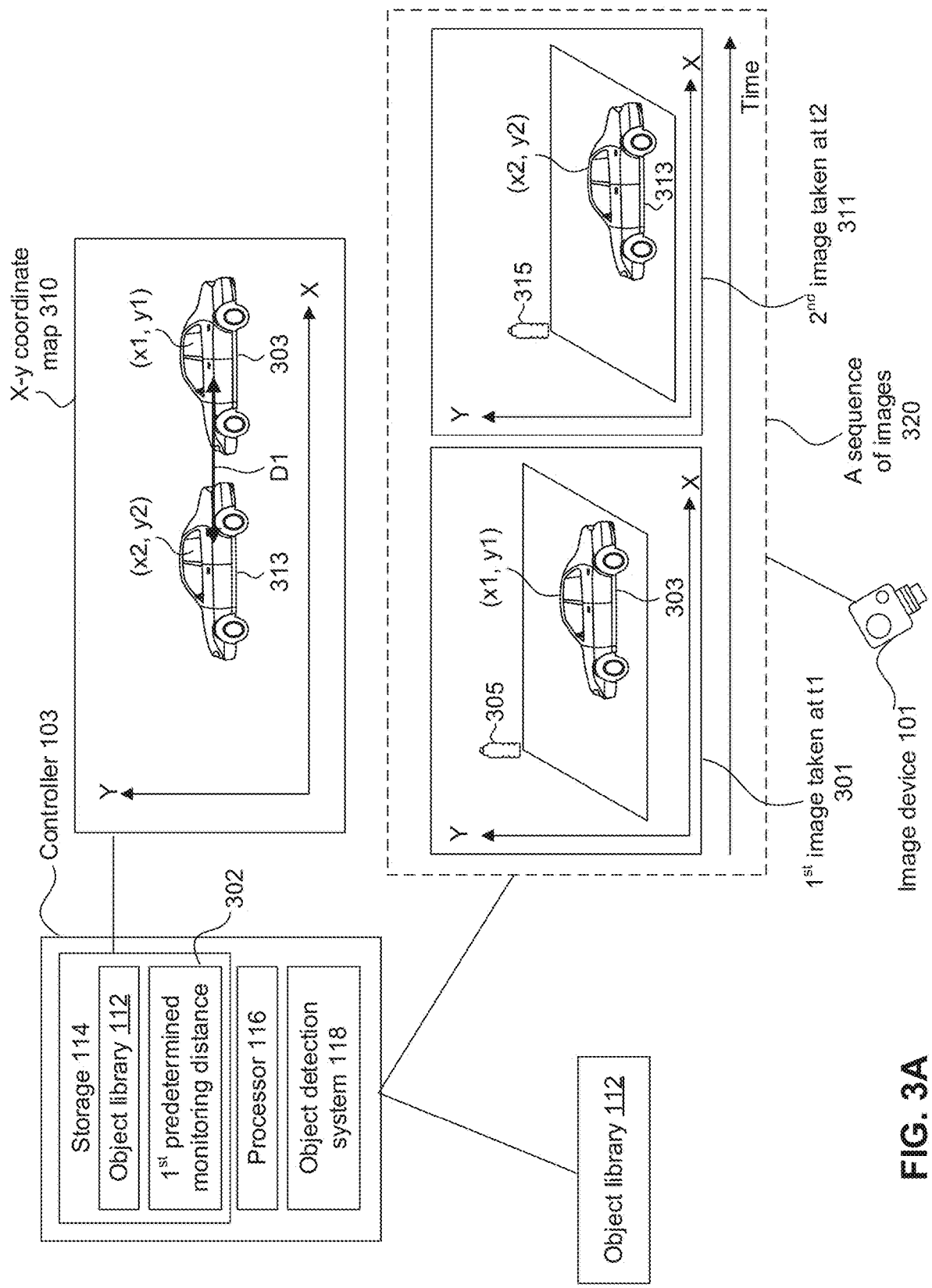
FIGS. 3A-3C illustrate a controller determining that a vehicle travels in a wrong-way based on detection of objects in a sequence of images of the detection zone, according to some embodiments.
Figure 3B:
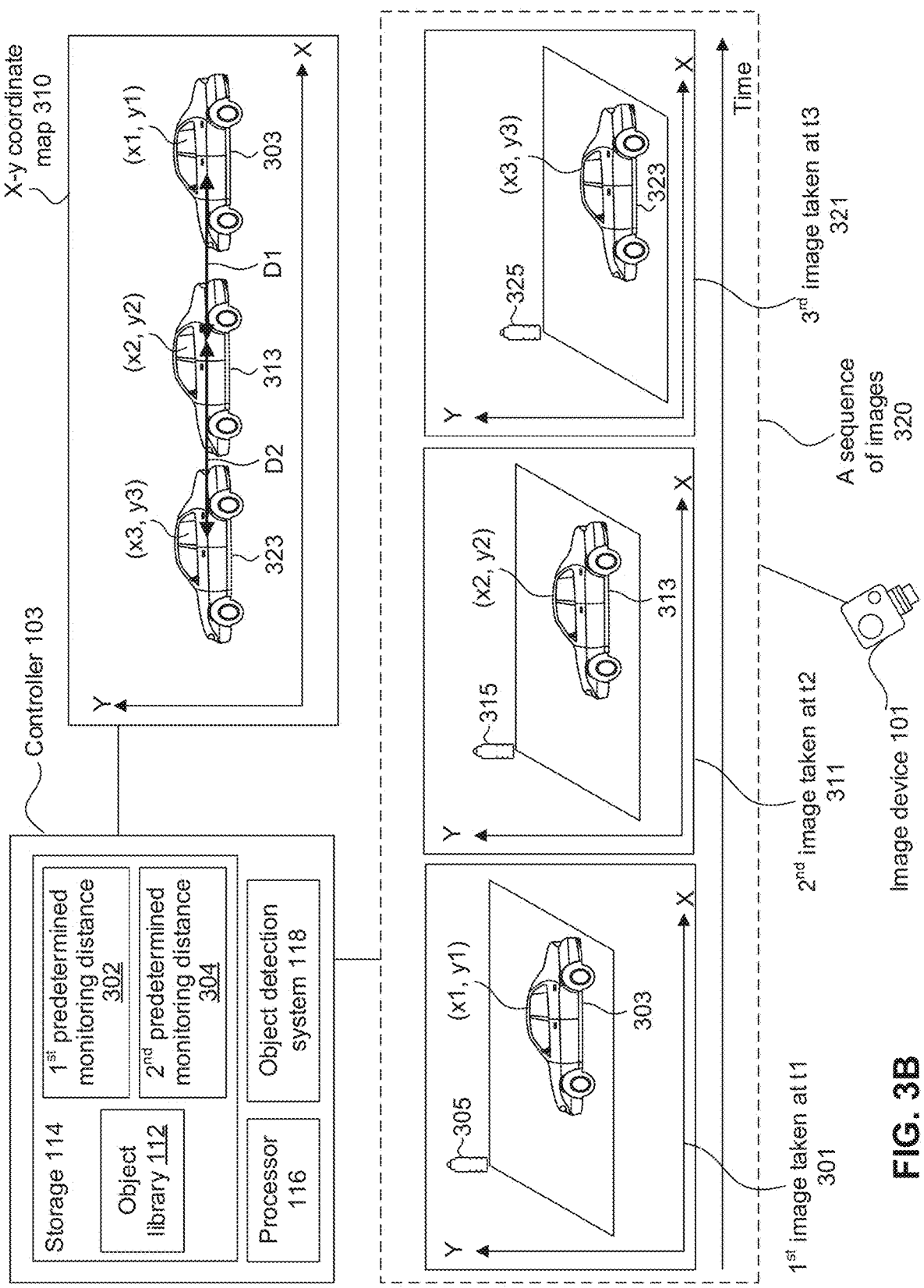
Figure 3C:
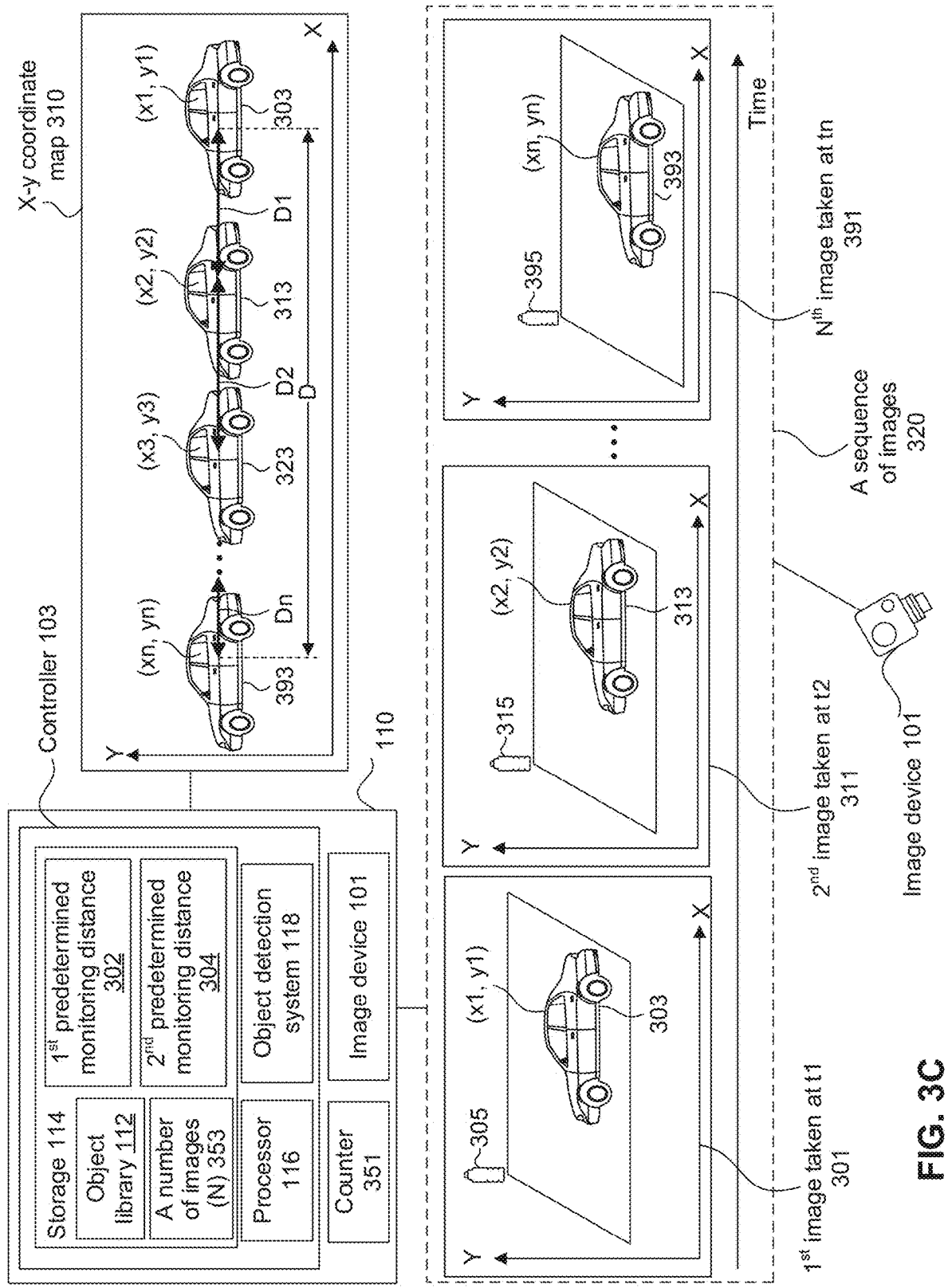
Figure 4A:
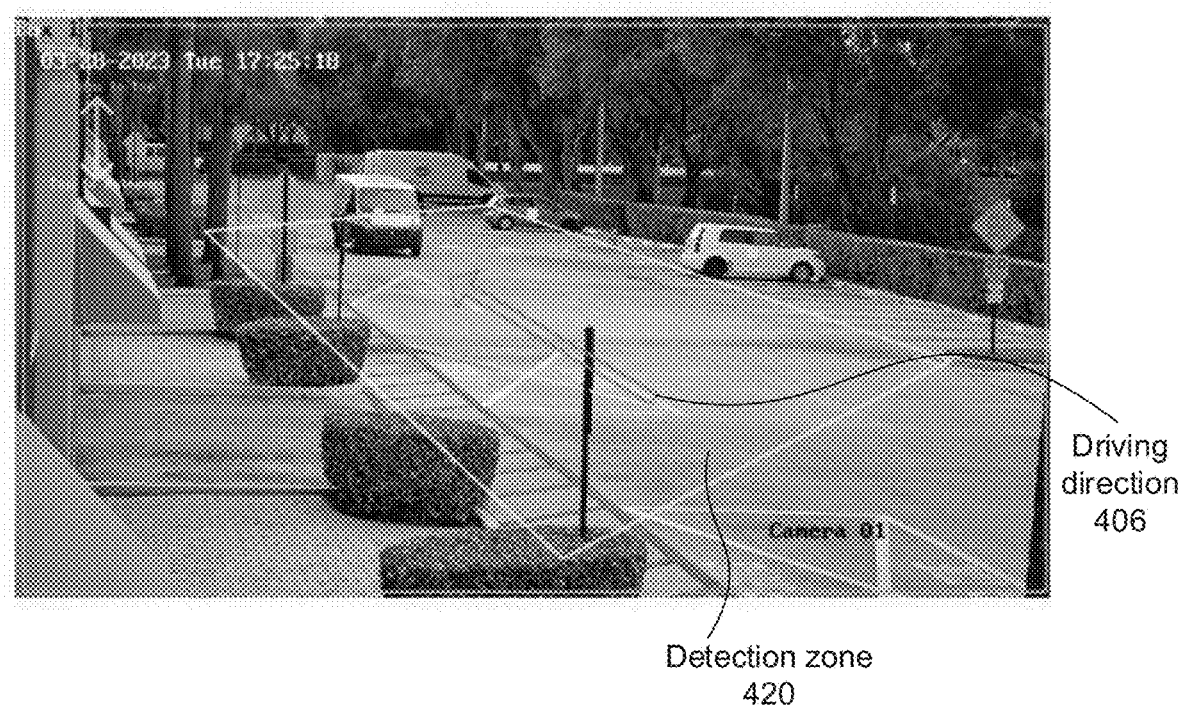
FIGS. 4A-4D illustrate an exemplary sequence of images used in determining a vehicle travelling in a wrong-way, according to some embodiments.
Figure 4B:
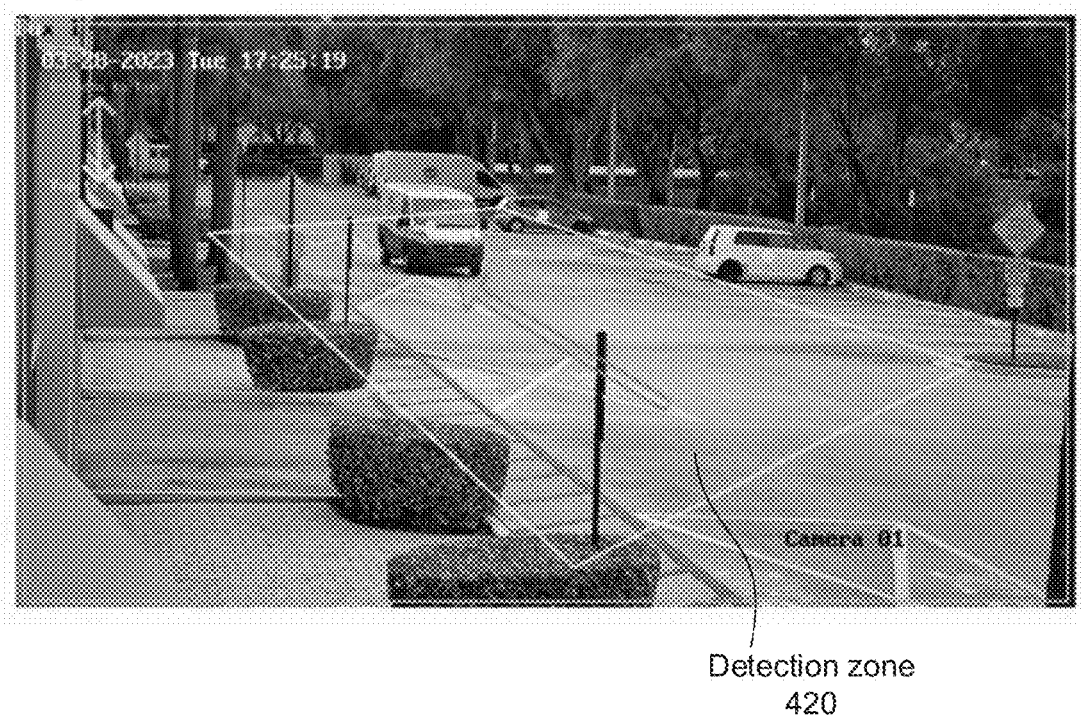
Figure 4C:
Figure 4D:

In some embodiments, as shown in FIG. 3A, controller 103 can receive a sequence of images 320 from imaging device 101, where the sequence of images 320 includes a first image 301 generated at a first time instance t1, and a second image 311 generated at a second time instance t2 after the first time instance t1. Based on object library 112, object detection system 118 can identify objects within detection zone 120 generated in the images. For example, object detection system 118 can identify an object 303 and an object 305 at the first image 301. In addition, object detection system 118 can identify an object 313 and an object 315 at the second image 311. In addition, object detection system 118 can determine whether object 303 or object 305 is a vehicle in the first image 301 based on object library 112, and whether object 313 or object 315 is a vehicle in the second image 311. For example, by using object library 112, object detection system 118 can determine object 303 or object 313 is a vehicle, and both are the same vehicle, while object 305 or object 315 is not a vehicle. In addition, object detection system 118 can detect that object 305 and object 315 are not a vehicle based on object library 112.

In some embodiments, object detection system 118 can perform various steps to detect objects. For example, object detection system 118 can apply artificial intelligence (AI) and machine learning (ML) techniques, perform object detection based on classification algorithms or regression algorithms. When a classification algorithm is used, object detection system 118 can select regions of interest in an image, such as image 301 or image 311, and further classify these regions using convolutional neural networks. An example implementation known to one having the ordinary skills in the art of this type of algorithm can include the Region-based convolutional neural network (RCNN) and its cousins Fast-RCNN, Faster-RCNN, and the latest addition to the family: Mask-RCNN. Additionally and alternatively, object detection system 118 can perform object detection based on regression algorithms. Instead of selecting interesting parts of an image, regression algorithm based object detection system 118 can predict classes and bounding boxes for the whole image in one run of the algorithm. For example, object detection system 118 can implement the You Only Look Once (YOLO) family algorithms, Single Shot Multibox Detector (SSD), or RetinaNet, which can be used in real-time object detection. Details of the various classification algorithms or regression algorithms for object detection system 118 are known to persons having ordinary skill in the art. For example, for the YOLO family algorithms, object detection system 118 can predict a class of an object and the bounding box specifying object location.

Each bounding box can be described using four descriptors: center of a bounding box (bxby) of the object, width (bw), height (bh), and value corresponding to a class of an object (e.g., car, traffic lights, etc.).

In some embodiments, object library 112 can include different objects and classes of objects using a ready library of pictures as a start. AI based on Machine Learning can be used to expand object library 112 and increase object learning for multiple objects with labelling and training to create weight files for the objects. The labelling and training of object library 112 can be performed offsite, since the labelling and training may take longer time range from several hours to several days depending on the number of images. After the machine learning based training, object library 112 can contain images of object, which can be copied to storage device 114 of controller 103 to improve detection and classification of objects.

In some embodiments, multiple objects are calculated and detected based on the movement direction of the objects. In some embodiments, only objects having a size bigger than a predetermined object size are detected and analyzed. Objects having a size smaller than the predetermined object size may be ignored for further processing. For example, object 315 and object 305 may be a water bottle, which may be smaller than the predetermined object size, and they can be ignored from further processing by object detection system 118.

At 204, controller 103 can determine a movement direction of the vehicle in the second image and a moving distance that the vehicle has travelled in the movement direction in the second image, and further determine if the movement direction of the vehicle is the same as the monitored direction.

In some embodiments, as shown in FIG. 3A, controller 103 can determine a movement direction of the vehicle, which is object 313 in the second image 311 and a moving distance that the vehicle has travelled in the movement direction in the second image 313, based on a first position of object 303 in the first image 301 and a second position of object 313 in the second image 311. In some embodiments, controller 103 can determine a first two dimensional coordinate (x1, y1) of object 303 in the first image 301, and a second two dimensional coordinate (x2, y2) of object 313 in the second image 311, and map both objects into a x-y coordinate map 310. Based on x-y coordinate map 310, controller 103 can determine the movement direction, which is the direction between (x1, y1)→(x2, y2) of the vehicle in the second image 311 and the moving distance of the vehicle based on the two dimensional coordinates (x1, y1) and (x2, y2). In detail, the two points at (x1, y1) and (x2, y2) can form a vector with a direction from (x1, y1) to (x2, y2). Controller 103 can match the direction from (x1, y1) to (x2, y2) to monitored direction 104 to see whether the two directions are the same or not. In addition, controller 103 can determine a distance between the two points at (x1, y1) and (x2, y2), which can be multiplied by a scaling factor of the first image 301 and the second image 311 to obtain the real physical distance between the two positions within detection zone 120.

At 206, in response to a determination that the movement direction of the vehicle is the same direction as the monitored direction and the moving distance of the vehicle is larger than a predetermined monitoring distance, the controller can output a warning signal that the vehicle is traveling in a wrong-way. In some embodiments, the warning signal can activate a highlighted flashing sign and/or a sound to alert a driver of the vehicle. In addition, the controller can provide a written or image notification to a server in a local traffic management center or law enforcement center.

In some embodiments, as shown in FIG. 3A, based on the movement direction of the vehicle and the moving distance D1 of the vehicle determined based on two points at (x1, y1) and (x2, y2), controller 103 can determine whether D1 is larger than a predetermined monitoring distance, e.g., a first predetermined monitoring distance 302. In response to a determination that the movement direction of the vehicle is the same direction as monitored direction 104 and the moving distance D1 is larger than the first predetermined monitoring distance 302, controller 103 can determine that the vehicle is on a wrong-way. By making such a determination based on both the movement direction of the vehicle is the same direction as monitored direction 104 and the moving distance D1 is larger than the first predetermined monitoring distance 302, vehicle wrong-way driving detection device 110 can greatly reduce the false alarm rate. For example, some other existing ITS may generate a false alarm rate at about 1%, while vehicle wrong-way driving detection device 110 can reduce the false alarm rate to about 0.001%.

In some embodiments, controller can output a warning signal, such as warning signal 107 to indicate that the vehicle is traveling in a wrong-way. In some embodiments, warning signal 107 can activate a highlighted flashing sign and/or a sound of warning sign 105 to alert a driver of the vehicle. In addition, controller 103 can provide a written or image notification to server 115 in local traffic management center or law enforcement center 109. In some embodiments, warning sign 105 can be installed on highway exit ramps for the purpose of warning drivers traveling in a direction counter to one-way traffic flow by activating highlighted flashing wrong-way warning signs so that the driver can take corrective action. In some embodiments, when the vehicle is a CA/AD vehicle, controller 103 can further report movements of RSUs and other vehicles connected to RSU to warn other vehicles on road 102 about the danger of the detected vehicle in the wrong-way.

FIG. 3B illustrates controller 103 determining that a vehicle travels in a wrong-way based on detection of objects in the sequence of images 320 of detection zone 120 including at least three images.

In some embodiments, the sequence of images 320 can further include a number of images that are more than two images such as the first image 301, and the second image 311. The first image 301 and the second image 311 can form two consecutive images, and moving distance D1 is a first moving distance between the two consecutive images. In response to a determination that the first moving distance D1 is smaller than the first predetermined monitoring distance 302 but larger than a second predetermined monitoring distance 304 between the two consecutive images, controller 103 can identify a third object 323 in a third image 321 generated at a third time instance t3 after the second time instance t2, where the third object 323 is the same vehicle as the first object 303 and the second object 313. In some embodiments, the first moving distance D1 is smaller than the first predetermined monitoring distance 302, the vehicle is not travelling faster enough for controller 103 to determine the vehicle is on the wrong-way. However, when the first moving distance D1 is larger than a second predetermined monitoring distance 304 between the two consecutive images, the vehicle is potentially travelling in a wrong direction, and controller 103 can consider a third image to make a further determination in a third time instance.

Accordingly, a determination made in considering multiple images at multiple time instances can reduce the chance for a false alarm.

In some embodiments, by using the same x-y coordinate map 310 further including the third object 323, controller 103 can determine a movement direction of the vehicle in the third image 321 and a second moving distance D2 that the vehicle has travelled in the movement direction in the third image 321 based on the second position of the second object 313, (x2, y2) in the second image 311, and a third position of the third object 323, (x3, y3), in the third image 321. In response to a determination that the movement direction of the vehicle in the third image 321 is same as monitored direction 104 and a sum of the first moving distance D1 and the second moving distance D2 is larger than the first predetermined monitoring distance 302, controller 103 can determine the vehicle is travelling in a wrong-way and output a warning signal, such as warning signal 107 to indicate that the vehicle is traveling in a wrong-way.

FIG. 3C illustrates controller 103 determining that a vehicle travels in a wrong-way based on detection of objects in the sequence of images 320 of detection zone 120 including multiple images that are more than three images.

In some embodiments, vehicle wrong-way driving detection device 110 can further include a counter 351 to count up to a predetermined number of images, e.g., an integer N, denoted as 353, of the sequence of images 320 including the first image 301, the second image 311 adjacent to the first image 301, and the third image 321 adjacent to the second image 311. For example, FIGS. 4A-4D illustrate an exemplary sequence of images including 4 images taken at 4 different time instances, e.g., at 17:25:18 shown in FIG. 4A, at 17:25:19 shown in FIG. 4B, at 17:25:20 shown in FIG. 4C, at 17:25:21 shown in FIG. 4D. FIGS. 4A-4D show a van is entering a detection zone 420 with a driving direction 406, while the van is driving in a wrong-way opposite to driving direction 406.

In some embodiments, by using the same x-y coordinate map 310 further including an additional object 393 in the Nth image 391 taken at time instance tn, controller 103 can determine a movement direction of the vehicle in the Nth image 391 and an additional moving distance Dn that the vehicle has travelled in the movement direction in the Nth image 391 based on the position of the additional object 393, (xn, yn) in the Nth image 391, and a position of an object in an adjacent image. Controller 103 can further determine a total moving distance D includes a sum of the first moving distance D1, the second moving distance D2, and one or more additional moving distance determined for two consecutive images, such as Dn.

In response to a determination that the movement direction of the vehicle in the Nth image 391 is same as monitored direction 104 and a sum of the first moving distance D1 the second moving distance D2, and the additional moving distance Dn is larger than the first predetermined monitoring distance 302, controller 103 can determine the vehicle is travelling in a wrong-way and output a warning signal, such as warning signal 107 to indicate that the vehicle is traveling in a wrong-way.

Figure 5:
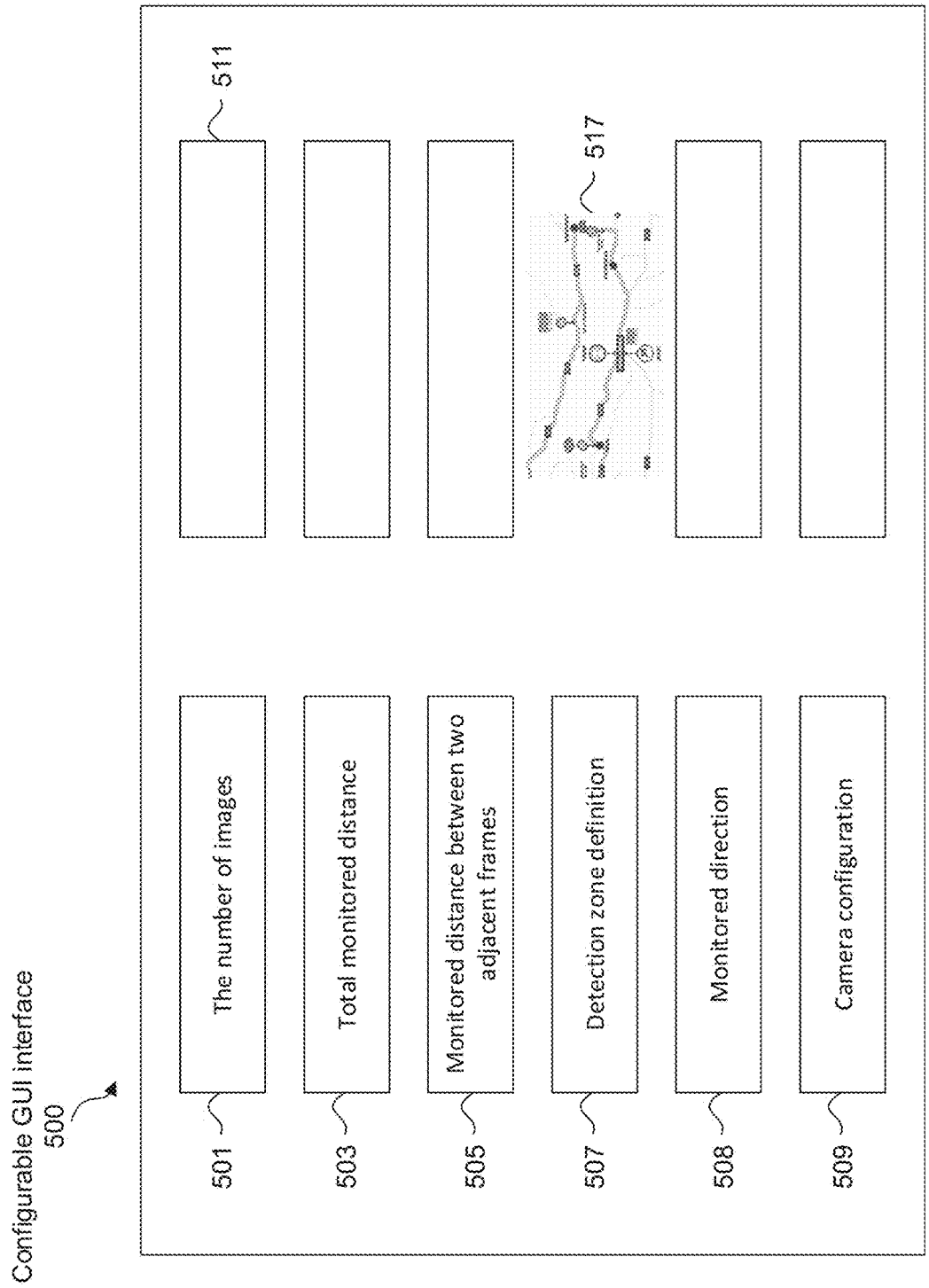
FIG. 5 illustrates an exemplary user interface of the controller configured to monitor the detection zone, according to some embodiments.

FIG. 5 illustrates an exemplary user interface 500 of a controller configured to monitor a detection zone, according to some embodiments. User interface 500 can be used to control or configure controller 103 or vehicle wrong-way driving detection device 110.

In some embodiments, user interface 500 can include various fields. A field can include a label to show the meaning of the field to a user, and a space to receive input from the user. For example, a field can have a label 501 for "the number of images", and a space 511 to receive user input to determine how many images are going to be analyzed by controller 103. Other labels can be presented for fields of interests, such as a label 503 for "total monitored distance," a label 505 for "monitored distance between two adjacent frames," a label 507 to define the detection zone, a label 508 for the monitored direction, and a label 509 for "camera configuration." Besides having a space, such as space 511 for the user to provide the input, other means can be used to receive a user input. For example, a map 517 can be used to let a user customize the detection zone.

In some embodiments, through user interface 500, controller 103 can receive a user input to adjust the predetermined number of images in the sequence of images of the detection zone (such as predetermined number of images 353), the first predetermined monitoring distance (such as the first predetermined monitoring distance 302), and/or the second predetermined monitoring distance between two consecutive images (such as the second predetermined monitoring distance 304 between the two consecutive images). After detection zones and expected direction of travel are configured, system tools can examine live vehicle direction and velocity. Controller 103 can detect a wrong-way event by the minimum number of consecutive frames that a vehicle is observed traveling in the wrong direction, the minimum distance (measured in pixels) between frames and the minimum total distance.

Figure 6:
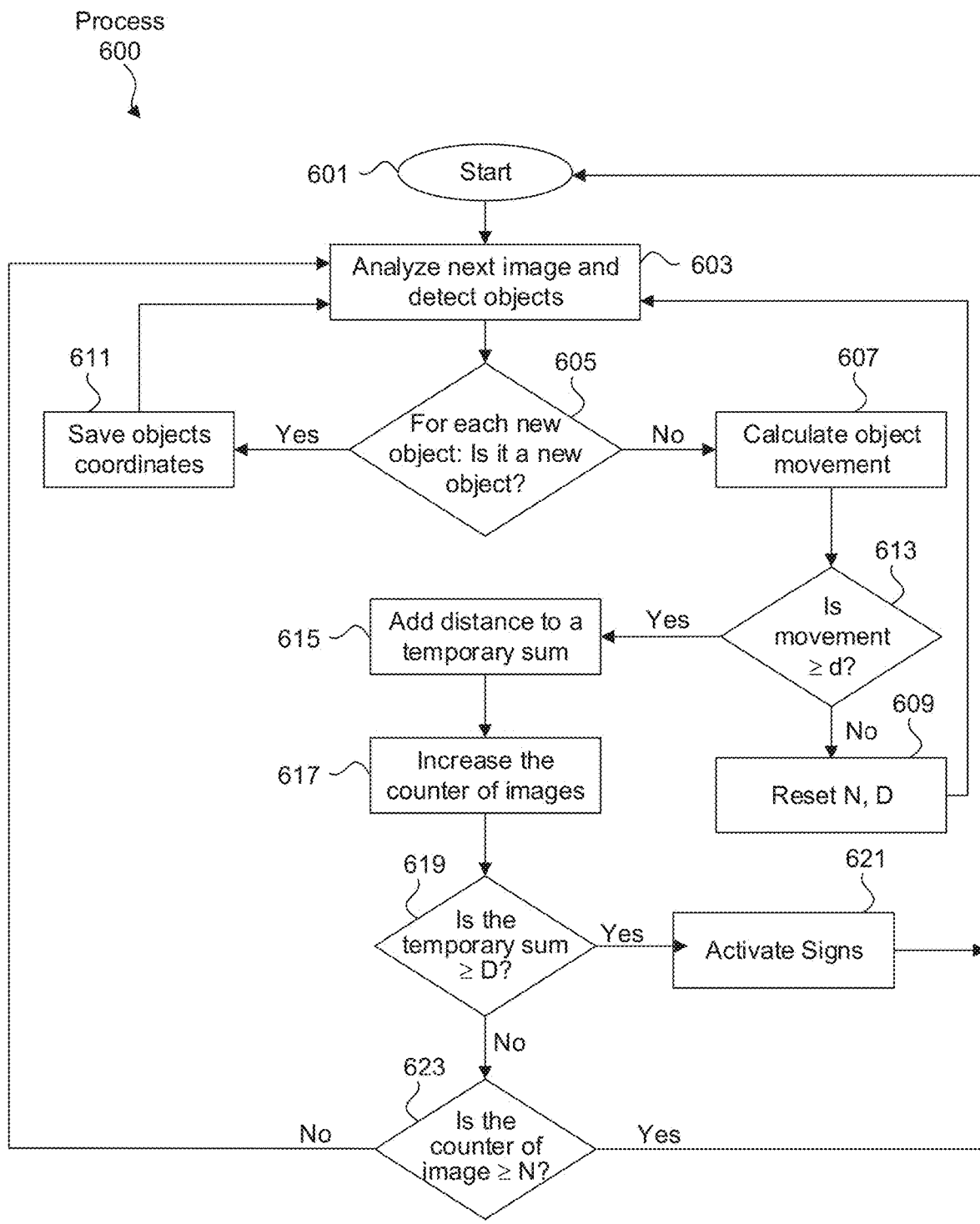
FIG. 6 illustrates an exemplary process for determining that a vehicle travels in a wrong-way based on detection of objects in a sequence of images of the detection zone, according to some embodiments.

FIG. 6 illustrates an exemplary process 600 for determining that a vehicle travels in a wrong-way based on detection of objects in a sequence of images of the detection zone, according to some embodiments. Process 600 can be performed by controller 103. Before process 600 starts, a sequence of images of detection zone 120 have been streamed by imaging device 101 and transmitted to controller 103 to be saved into storage 114. Processor 116 and object detection system 118 can perform process 600. Process 600 can be viewed as a special case of process 200 where multiple images are analyzed.

In some embodiments, process 600 starts at 601. Controller 103 can receive consecutive images, such as the sequence of images 320 as shown in FIGS. 3A-3C. At 603, controller 103 or object detection system 118 can detect and identify all objects on the images, and further compare objects on two consecutive images. At 605, for each object, controller 103 can determine whether the object is a new object. When the object is a new object, at 611, controller 103 can save the object and its two dimensional coordinates into storage of controller 103. When the object is not a new object, at 607, controller 103 can track the movement of the object. Operations can be performed for all objects that exist on 2 consecutive images. If the object moves in the right direction instead of the monitored direction 104, the object can be dropped from further processing. If the object moves in the wrong direction, which is the monitored direction 104, at 613, controller 103 can calculate the movement distance of the object between consecutive images, as shown in the calculation of distance D1 shown in FIG. 3A. If the movement distance of the object between two consecutive images is smaller than a predetermined distance d, which is an example of the 2nd predetermined monitoring distance 304 shown in FIG. 3B, at 609, controller 103 can reset the value of a parameter N indicating the number of images being analyzed, a parameter D indicating a total distance between all N images, where parameter D is an example of the 1st predetermined monitoring distance 302 as shown in FIG.

3B. If the movement distance of the object between two consecutive images is bigger than or equal to the predetermined distance d, at 615, controller 103 can add the movement distance of the object between two consecutive images to a temporty sum for previously analyzed consecutive images. At 617, controller 103 can further increase the counter of images being analyzed. At 619, controller 103 can compare the temporty sum for previously analyzed consecutive images with the parameter D indicating a total distance between all N images. If the tempory sum is greater than D, at 621, controller 103 can generate warning signal 107 to indicate that the vehicle is traveling in a wrong-way. In some embodiments, warning signal 107 can activate a highlighted flashing sign and/or a sound of warning sign 105 to alert a driver of the vehicle. On the other hand, when the tempory sum is not greater than D, at 623, controller 103 can compare the current counter of images to the parameter N indicating the total number of images to be analyzed. If the current counter of images is larger than or equal to the parameter N, controller 103 can loop back to 601 to start the analysis again. If the current counter of images is smaller than the parameter N, controller 103 can save the temporary sum, and repeat the analysis for the next image at 603.

Figure 7:
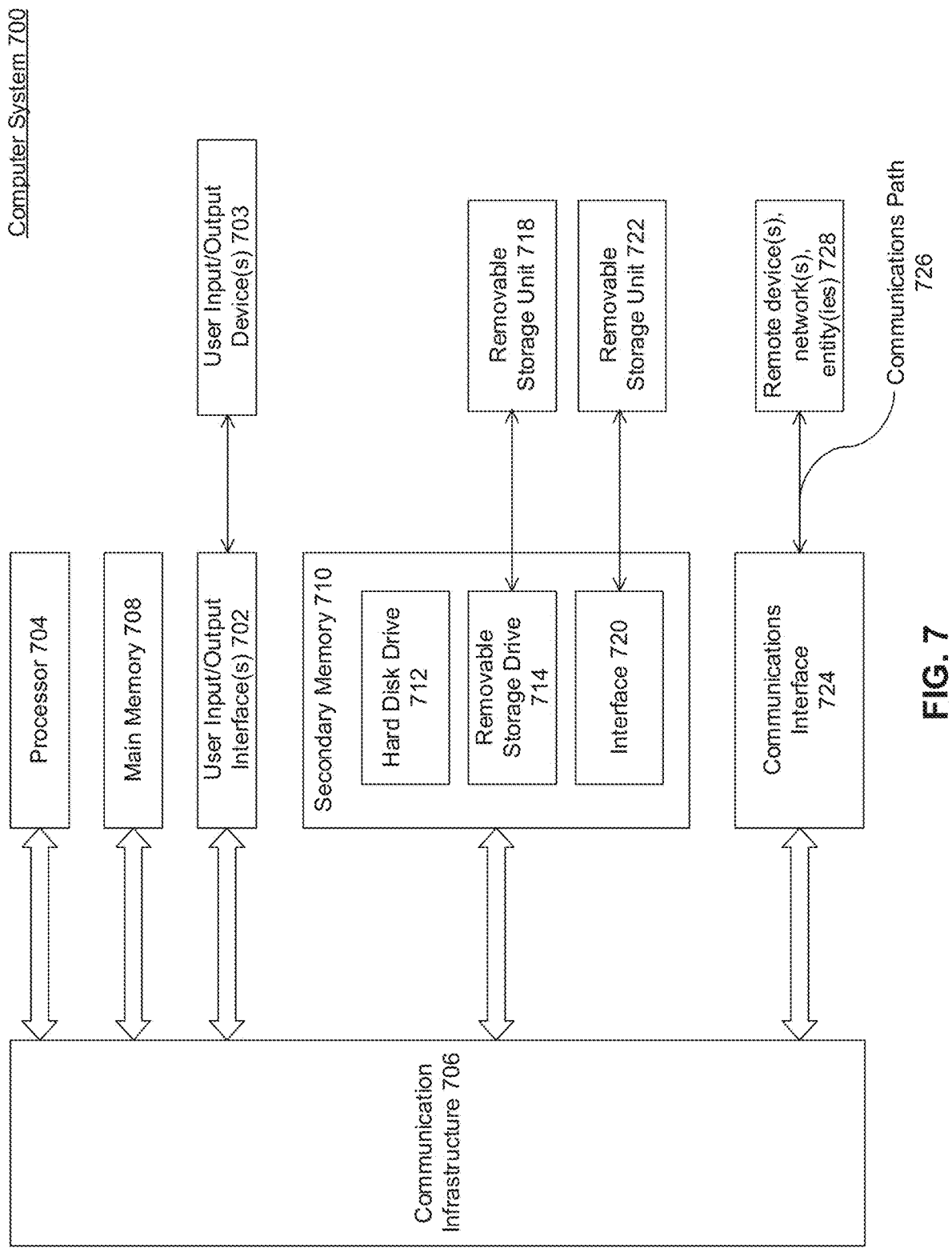
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 can include one or more processors (also called central processing units, or CPUs), such as a processor 704. Processor 704 can be connected to a communication infrastructure or bus 706. Computer system 700 can be examples of controller 103, server 115, and can be used to implement functions of vehicle wrong-way driving detection device 110, imaging device 101, or warning sign 105, or implement operations illustrated in process 200, or process 600.

Computer system 700 can also include user input/output device(s) 703, such as monitors, keyboards, pointing devices, etc., which may communicate with communication infrastructure 706 through user input/output interface(s) 702.

One or more of processors 704 can be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 can also include a main or primary memory 708, such as random access memory (RAM). Main memory 708 may include one or more levels of cache. Main memory 708 can have stored therein control logic (i.e., computer software) and/or data.

Computer system 700 can also include one or more secondary storage devices or memory 710. Secondary memory 710 can include, for example, a hard disk drive 712 and/or a removable storage device or drive 714. Removable storage drive 714 can be a floppy disk drive, a magnetic tape drive, a compact disk drive, an optical storage device, tape backup device, and/or any other storage device/drive.

Removable storage drive 714 can interact with a removable storage unit 718. Removable storage unit 718 can include a computer usable or readable storage device having stored thereon computer software (control logic) and/or data. Removable storage unit 718 can be a floppy disk, magnetic tape, compact disk, DVD, optical storage disk, and/any other computer data storage device. Removable storage drive 714 can read from and/or write to removable storage unit 718.

Secondary memory 710 can include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 can further include a communication or network interface 724. Communication interface 724 can enable computer system 700 to communicate and interact with any combination of external devices, external networks, external entities, etc. (individually and collectively referenced by reference number 728). For example, communication interface 724 can allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726. Computer system 700 can further include a camera 733.

Computer system 700 can also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), can cause such data processing devices to operate as described herein. For example, control logic can cause processor 704 to identify a first object in the first image generated at a first time instance; identify a second object in the second image generated at a second time instance after the first time instance; determine if the first object is a vehicle, and if the second object is the same vehicle; determine a movement direction of the vehicle in the second image and a moving distance that the vehicle has travelled in the movement direction in the second image, based on a first position of the first object in the first image and a second position of the second object in the second image; determine if the movement direction of the vehicle is the same as the monitored direction; and in response to a determination that the movement direction of the vehicle is the same direction as the monitored direction and the moving distance of the vehicle is larger than a predetermined monitoring distance, output a warning signal to indicate that the vehicle is traveling in a wrong-way, as described for process 200 and shown in FIG. 2.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A vehicle wrong-way driving detection device, comprising:
   an imaging device configured to monitor a detection zone for traffic in a monitored direction and configured to generate a sequence of images of the detection zone including a first image and a second image;
   a controller communicatively coupled to the imaging device, the controller configured to:
   identify a first object in the first image generated at a first time instance;
   identify a second object in the second image generated at a second time instance after the first time instance;
   determine whether the first object is a vehicle and whether the second object is the same vehicle;
   determine a movement direction of the vehicle in the second image and a first moving distance that the vehicle has travelled in the movement direction in the second image, based on a first position of the first object in the first image and a second position of the second object in the second image;
   determine whether the movement direction of the vehicle is the same as the monitored direction; and
   in response to a determination that the first moving distance is smaller than a first predetermined monitoring distance but larger than a second predetermined monitoring distance between the first and second images:
   identify a third object in a third image generated at a third time instance after the second time instance, wherein the third object is the same vehicle as the first object and the second object;
   determine a second moving distance that the vehicle has travelled in the movement direction in the third image based on the second position of the second object in the second image and a third position of the third object in the third image; and
   in response to a determination that the movement direction of the vehicle is the same direction as the monitored direction and a sum of the first moving distance and the second moving distance is larger than the first predetermined monitoring distance, output a warning signal to indicate that the vehicle is traveling in a wrong-way.

2. The vehicle wrong-way driving detection device of claim 1, wherein:

the first image and the second image form two consecutive images, and the controller is further configured to:
- determine a movement direction of the vehicle in the third image; and
- in response to a determination that the movement direction of the vehicle in the third image is same as the monitored direction, output the warning signal.

3. The vehicle wrong-way driving detection device of claim 2, wherein the vehicle wrong-way driving detection device further includes a counter to count up to a predetermined number of images of the sequence of images including the first image, the second image adjacent to the first image, and the third image adjacent to the second image, and wherein in response to a determination that the sum of the first moving distance and the second moving distance is less than the first predetermined monitoring distance, the controller is further configured to:
- determine a total moving distance travelled by the vehicle based on the predetermined number of images where the vehicle is identified, wherein the total moving distance includes a sum of the first moving distance, the second moving distance, and one or more additional moving distance determined for two consecutive images; and
- in response to a determination that the total moving distance travelled by the vehicle is larger than the first predetermined monitoring distance, output the warning signal.

4. The vehicle wrong-way driving detection device of claim 3, wherein the controller is further configured to receive one or more user inputs to adjust the predetermined number of images in the sequence of images of the detection zone, the first predetermined monitoring distance, and the second predetermined monitoring distance between two consecutive images.

5. The vehicle wrong-way driving detection device of claim 1, wherein to determine the movement direction of the vehicle in the second image and the first moving distance of the vehicle, the controller is configured to:
- determine a first two dimensional coordinate of the first object in the first image and a second two dimensional coordinate of the second object in the second image; and
- determine the movement direction of the vehicle in the second image and the first moving distance of the vehicle based on the first two dimensional coordinate of the first object in the first image and the second two dimensional coordinate of the second object in the second image.

6. The vehicle wrong-way driving detection device of claim 1, wherein the controller is further configured to in response to a determination that the movement direction of the vehicle is same as the monitored direction and the sum of the first moving distance and the second moving distance of the vehicle is larger than the first predetermined monitoring distance, provide a written or image notification to a server in a local traffic management center or law enforcement center.

7. The vehicle wrong-way driving detection device of claim 1, wherein:
- the imaging device is installed in a location near a highway exit, and
- the detection zone includes a ramp to a highway.

8. The vehicle wrong-way driving detection device of claim 1, wherein the first object and the second object are identified based on an object library provided using machine learning.

9. The vehicle wrong-way driving detection device of claim 1, wherein the warning signal activates a highlighted flashing sign or a sound to alert a driver of the vehicle.

10. The vehicle wrong-way driving detection device of claim 1, wherein the imaging device includes at least one sensor configured to stream a sequence of images to the controller.

11. The vehicle wrong-way driving detection device of claim 10, wherein the imaging device includes a thermal sensor configured to assign a temperature to a pixel color for an image of the sequence of images based on a heat level sensed by the thermal sensor.

12. A method performed by a computing device, comprising:
- identifying a first object in a first image generated at a first time instance by an imaging device installed in a location to monitor a detection zone for traffic in a monitored direction, wherein the first image is among a sequence of images of the detection zone streamed by the imaging device including the first image and a second image;
- identifying a second object in the second image generated at a second time instance after the first time instance;
- determining whether the first object is a vehicle and whether the second object is the same vehicle;
- determining a movement direction of the vehicle in the second image and a first moving distance that the vehicle has travelled in the movement direction in the second image, based on a first position of the first object in the first image and a second position of the second object in the second image;
- determining whether the movement direction of the vehicle is the same as the monitored direction; and
- in response to a determination that the first moving distance is smaller than a first predetermined monitoring distance but larger than a second predetermined monitoring distance between the first and second images:
  - identifying a third object in a third image generated at a third time instance after the second time instance, wherein the third object is the same vehicle as the first object and the second object;
  - determining a second moving distance that the vehicle has travelled in the movement direction in the third image based on the second position of the second object in the second image and a third position of the third object in the third image; and
  - in response to a determination that the movement direction of the vehicle is the same direction as the monitored direction and a sum of the first moving distance and the second moving distance is larger than the first predetermined monitoring distance, generating a warning signal to indicate that the vehicle is traveling in a wrong-way.

13. The method of claim 12, wherein:
the first image and the second image form two consecutive images, and
the method further comprises:
- determining a movement direction of the vehicle in the third image; and in response to a determination that the movement direction of the vehicle in the third image is same as the monitored direction, generating the warning signal.

14. The method of claim 13, wherein the sequence of images includes the first image, the second image adjacent to the first image, the third image adjacent to the second image, and one or more additional images, the method further comprises:
in response to a determination that the sum of the first moving distance and the second moving distance is less than the first predetermined monitoring distance, determining a total moving distance travelled by the vehicle based on a predetermined number of images where the vehicle is identified, wherein the total moving distance includes a sum of the first moving distance, the second moving distance, and one or more additional moving distance determined for two consecutive images; and
in response to a determination that the total moving distance travelled by the vehicle is larger than the first predetermined monitoring distance, generating the warning signal.

15. The method of claim 14, further comprising:
receiving one or more user inputs to adjust the predetermined number of images in the sequence of images of the detection zone, the first predetermined monitoring distance, and the second predetermined monitoring distance between two consecutive images.

16. The method of claim 12, wherein the determining the movement direction of the vehicle in the second image and the first moving distance of the vehicle comprises:
determining a first two dimensional coordinate of the first object in the first image and a second two dimensional coordinate of the second object in the second image; and
determining the movement direction of the vehicle in the second image and the first moving distance of the vehicle based on the first two dimensional coordinate of the first object in the first image and the second two dimensional coordinate of the second object in the second image.

17. The method of claim 12, further comprising, in response to a determination that the movement direction of the vehicle is same as the monitored direction and the sum of the first moving distance and the second moving distance of the vehicle is larger than the first predetermined monitoring distance, providing a written or image notification to a server in a local traffic management center or law enforcement center.

18. A non-transitory computer readable medium including instructions, that, when executed by a processor, cause the processor to perform operations comprising:
identifying a first object in a first image streamed at a first time instance by an imaging device installed in a location to monitor a detection zone for traffic in a monitored direction, wherein the first image is among a sequence of images of the detection zone streamed by the imaging device including the first image and a second image;
identifying a second object in the second image streamed at a second time instance after the first time instance;
determining whether the first object is a vehicle and whether the second object is the same vehicle;
determining a movement direction of the vehicle in the second image and a first moving distance that the vehicle has travelled in the movement direction in the second image, based on a first position of the first object in the first image and a second position of the second object in the second image;
determining whether the movement direction of the vehicle is the same as the monitored direction;
in response to a determination that the first moving distance is smaller than a first predetermined monitoring distance but larger than a second predetermined monitoring distance between the first and second images:
identifying a third object in a third image generated at a third time instance after the second time instance, wherein the third object is the same vehicle as the first object and the second object;
determining a second moving distance that the vehicle has travelled in the movement direction in the third image based on the second position of the second object in the second image and a third position of the third object in the third image; and
in response to a determination that the movement direction of the vehicle is the same direction as the monitored direction and a sum of the first moving distance and the second moving distance is larger than the first predetermined monitoring distance, generating a warning signal to indicate that the vehicle is traveling in a wrong-way.

19. The non-transitory computer readable medium of claim 18, wherein:
the first image and the second image form two consecutive images, and
the instructions, when executed by the processor, further cause the processor to perform operations comprising:
determining a movement direction of the vehicle in the third image; and
in response to a determination that the movement direction of the vehicle in the third image is same as the monitored direction, generating the warning signal.

20. The non-transitory computer readable medium of claim 18, wherein the imaging device includes a sensor configured to stream thermal image sequences indicating a heat level of the vehicle.

* * * * *